April 26, 1966     D. A. HYNES ET AL     3,248,617

NONBURSTING ELECTRICAL CAPACITOR

Filed Nov. 12, 1963

DAVID A. HYNES
PAUL H. NETHERWOOD
LIVINGSTON L. RICE
*INVENTORS*

BY *Connolly and Hutz*

THEIR ATTORNEYS

United States Patent Office  
3,248,617  
Patented Apr. 26, 1966

3,248,617
NONBURSTING ELECTRICAL CAPACITOR
David A. Hynes, Paul H. Netherwood, and Livingston L. Rice, Williamstown, Mass., assignors to Sprague Electric Company, North Adams, Mass., a corporation of Massachusetts
Filed Nov. 12, 1963, Ser. No. 322,590
2 Claims. (Cl. 317—242)

The present invention is concerned with electrical capacitors, and more particularly with hermetically sealed capacitors which tend to generate sufficient internal gas pressure to burst the units.

The dangers of a bursting capacitor are well-known to those skilled in the art and need not be elaborated upon.

It is an object of this invention to eliminate the dangers attendant the bursting of a liquid dielectric-impregnated rolled capacitor.

This and other objects and advantages of the present invention will be made obvious to those skilled in the art by the following description when considered in relation to the accompanying drawing, of which:

Figure 1:
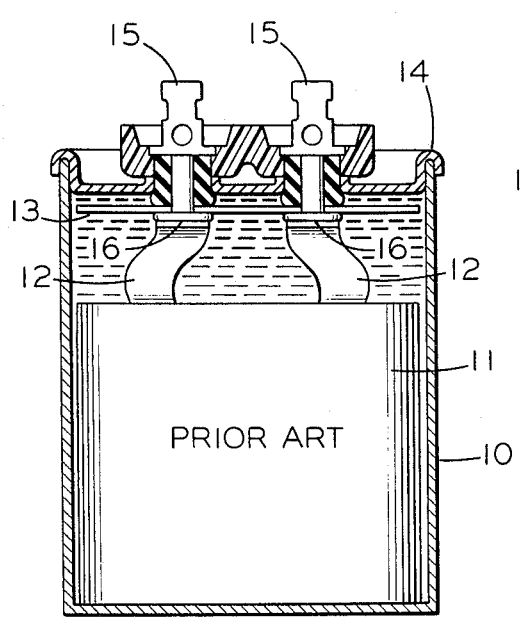
FIGURE 1 is a side-view, partly in section, of a conventional hermetically sealed, liquid dielectric-impregnated, rolled capacitor.

FIGURE 1 illustrates a conventional, hermetically sealed capacitor comprising a can 10 containing a rolled capacitor section 11; conductive tabs or leads 12; flexible insulating spacer 13; can cover 14 and terminals 15. The conductive tabs 12 are soldered, riveted or welded to the bottom of terminals 15 as shown at 16. This capacitor is filled with a liquid dielectric.

It will be noted that the tabs 12 have considerable slack between the top of section 11 and the connections 16 at the bottom of the terminals. The reason for this slack is that the welding, riveting or soldering of the tabs is accomplished by reaching under the can cover with the soldering, riveting or welding device and making the connection. In order to make room for the soldering, riveting or welding device and insure a good connection it is, therefore, necessary to use a longer tab than is actually required for electrical communication.

One way in which a capacitor of this type generates gas is when a short develops. When this happens the can bulges in all directions with a considerable doming of the can cover. When the capacitor bursts, the point of opening is commonly at the seam joining the can cover and the can.

The objects of the present invention are attained by employing the bulging or doming of the can cover as the means for disconnecting at least one tab from its terminal connection and thereby stopping further rapid generation of pressure. This is accomplished by positioning a substantially nonflexible elongated member against or adjacent the underside of the can cover and affixing to it at least one of the conductive leads or tabs. The tab length between the elongated member and the terminal must be such that progressive doming or bulging of the can cover will be stopped by disconnection of the tab from the terminal before bursting of the can. When the cover bulges or domes, the center moves a much greater distance than the edges. As the doming cover pulls on the elongated member, the outer edges of the cover become the points of abutment for said member, stopping further movement of said member. As the doming progresses at least one tab will be severed or disconnected from a terminal. Severance can be facilitated by notching the tabs.

Figure 2:
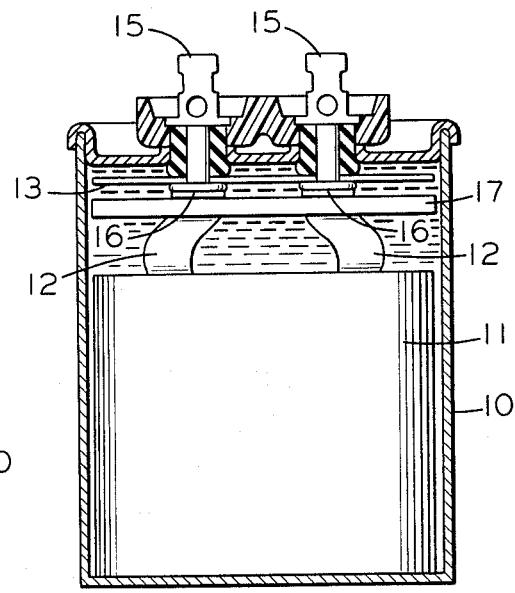
FIGURE 2 is a side-view, partly in section, of the capacitor of the present invention.
Figure 4:
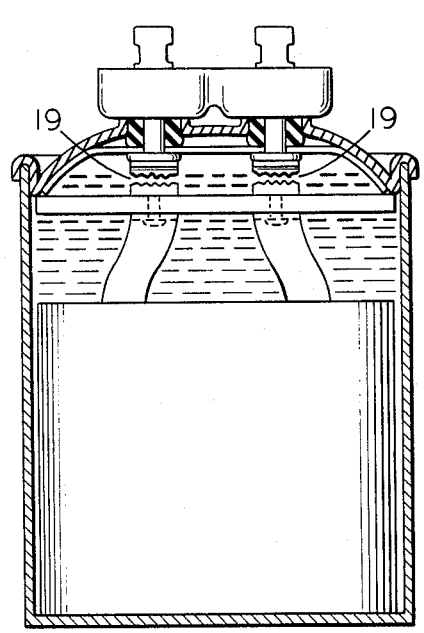
FIGURE 4 is a side-view, partly in section, of the capacitor of this invention after being subjected to internal pressure.

The invention is best illustrated by reference to FIGURES 2, 3 and 4. FIGURE 2 has all of the essential capacitor elements of FIGURE 1 and in addition it shows member 17, which is a substantially nonflexible elongated member. This member corresponds roughly in length to the longer inside diameter of the oval can cover. It is positioned as close as possible to connections 12 at the bottom of terminals 15.

Figure 3:
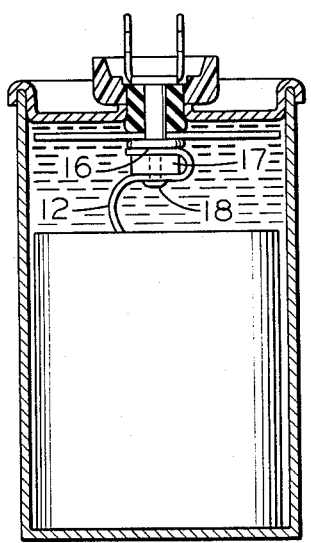
FIGURE 3 is an end-view of the capacitor of FIGURE 2.

FIGURE 3 shows member 17 in the preferred position at the underside of the can cover. Tab 12 is fastened to member 17 by means of a rivet 18 or other suitable fastener. When internal pressure builds up and domes the cover, as in FIGURE 4, at least one of the tabs will be torn apart, as shown at 19, or disconnected from the terminals.

The elongated member 17 can be of any convenient cross-section, e.g. square, oval, rectangular, etc. It must be substantially nonflexible so as not to yield when the can cover begins to dome. Any one of a number of commercial materials, so long as they are compatible, will serve the purpose, e.g. phenol-formaldehyde resins, polyamides, wood, etc. Instead of being riveted to member 17 the tab may be stapled, screwed, etc. thereto.

The capacitor can need not be of oval cross-section but may be square, round, etc.

As is evident from the foregoing, the invention is not to be limited to formation of the rather specific illustrative device. Modifications and variations, as well as the substitution of equivalents, may be made without departing from the spirit of the invention as defined in the appended claims.

What is claimed is:
1. An electrical capacitor compirsing a capacitor section in a hermetically sealed can, said section being connected to terminals in the cover of said can via conductive tabs, a substantially nonflexible elongated member, approximately the same length as the underside of the can cover, is affixed to at least one conductive tab and positioned adjacent the underside of the can cover; the tab length between said elongated member and the terminal being such that progressive doming of the cover will be stopped short of bursting by disconnection of said tab from said terminal.

2. An electrical capacitor comprising a capacitor section in a hermetically sealed can, which has an oval cross-section, said section being connected to two terminals in the cover of said can via conductive tabs; a substantially nonflexible elongated member, approximately the same length as the larger diameter of the underside of the can cover, is affixed to the tabs and positioned adjacent the underside of the can cover; the tab lengths between said elongated member and the terminals being such that progressive doming of the cover will be stopped short of bursting by disconnection of said tab from said terminal.

References Cited by the Examiner
UNITED STATES PATENTS 2,896,049  7/1959  Maier _____ 317—256 X
2,944,196  7/1960  Peck _____ 317—242 X

FOREIGN PATENTS 1,298,073  4/1962  France.

JOHN F. BURNS, Primary Examiner.